UNITED STATES PATENT OFFICE 2,021,947

MAKING GREASE AND MOISTUREPROOF PAPER AND SIMILAR MATERIAL

John E. Schopp, Oak Park, Ill.

No Drawing. Application September 12, 1933,
Serial No. 689,161

8 Claims. (Cl. 91—68)

This invention relates to the art of rendering paper and other fibrous materials impervious to water and to grease. More particularly the invention comprises applying a coating or coatings of the barrier solution, compounded in accordance with this invention, to one or both surfaces of the paper, or other material being treated.

It is an object of the invention to provide a new and improved water-proofing and grease-proofing agent for paper and similar materials. It is a further object of the invention to provide a solution adapted to be applied to the surface of paper which prevents the passage of moisture and grease thru that paper yet which leaves the treated surface suitable for print. A still further object of the invention is the provision of a water-proofing and grease-proofing composition which is economical to manufacture, which may be applied in any well known manner, and which is entirely efficacious. Still another object is to provide a composition for rendering paper impervious to moisture and grease and at the same time imparting flexibility and suppleness thereto. A still further object is to treat paper and similar packaging materials, used in connection with the retailing of edible foodstuffs, with a grease-proofing and moisture-proofing solution which contains no injurious elements and which is odorless and colorless. These and other more specific objects will be apparent to those skilled in the art in the light of the following specification.

Papers and containers used as packaging means for butters, lards and similar substances are usually treated to prevent the passage of grease and water therethru. Printed matter is often placed upon such papers and containers, the appearance of which is spoiled by the presence of spots of grease or water. The ingredients used in the solution or composition which is applied to the surface to be treated must not be capable of chemically affecting the protected substance and the ingredients themselves must, in fact, be safe for human consumption in the quantities present. There must be no odor to the surfacing means which would adversely affect the salability of the unit and preferably the means should be colorless although coloring can be provided if desired. In the coating solution or compound of the present invention the desirable characteristics enumerated above are to be found and are produced by the application of a relatively thin coating of the invention to the surface to be treated.

In the solution prepared in accordance with this invention the following ingredients are incorporated in the proportions indicated:

1 part or 1 lb. of modified starch
1 part or 1 lb. of casein
$\frac{1}{16}$ part or 1 ounce of ammonia
4 parts or 4 lbs. of clay
1½ parts or 1½ lbs. of glucose or glycerine
5 pints concentrated latex (50% solids)
4 pints of shellac solution (1 lb. shellac dissolved in 8 lbs. H$_2$O)

As no two papers are exactly alike it is within the scope of this invention to vary certain of the proportions set forth. For example, on account of the variations in the sizing of papers, it may be desirable to use ½ lb. of starch and ½ lb. of casein. The amount of latex used may vary for the same reasons. In the solution stated, however, a maximum of 5 pints of latex may be recognized.

Casein is put into solution by the use of water and ammonia. One part casein, 6 parts water and $\frac{1}{16}$ part ammonia, or in other words, 1 lb. casein, 6 lbs. water and 1 ounce ammonia, may be used.

The use of a modified starch makes unnecessary the use of casein in amounts which would be undesirable because of odor. The starch is odorless and has desirable spreading characteristics. It may be put into solution by using 1 lb. of starch and 15 to 20 lbs. of water.

Clay is used as a filler to give the solution body and the paper slippage. A china clay is preferred, thinned by water into a thin slurry.

The glucose or glycerine used in the solution is hygroscopic in character and imparts a suppleness to the paper, preventing cracking under dry atmospheric conditions and when folded.

Latex, which should be pure and concentrated, performs the function of closing the pores of the paper and resists the passage of moisture and grease. Its presence aids the folding qualities of the paper. Its combination with the other ingredients in the relationship specified makes unnecessary its use in excessive amounts.

The shellac solution is used as a hardening agent to provide a hard coating and to give the paper good slippage. It assists in rendering the paper grease-proof and in preventing the latex from sticking. A gallon of this shellac solution is made as follows: 1 lb. of bleached or orange shellac, 8 lbs. of water, 6 ounces of 26 degree ammonia. The solution is brought to a boil and strained.

In mixing the solution the clay slurry can be mixed with the casein solution and then the starch solution mixed in. To this mixture is added the glucose or glycerine and then the latex solution. Upon the foregoing being well mixed the shellac solution is added. The entire solution is preferably strained thru a strainer of 90 to 100 wire mesh after which it is ready to apply to paper.

The preferred composition of this invention therefore consists of the following active ingredients in which parts indicated are parts by weight:

| | Parts |
|---|---|
| Modified starch | 1 |
| Casein | 1 |
| Ammonia | 1/16 |
| Clay | 4 |
| Glucose or glycerine | 1½ |
| Rubber latex solids | 2½ |
| Bleached or orange shellac | ½ |
| Total | 10 9/16 |

These materials are placed in solution as indicated above and are admixed to give the proportions indicated. It is obvious that the composition may be diluted if desired before applying to the paper to be coated. The mixture of active ingredients used, however, includes only about ½ part of bleached or orange shellac in a total of 10 9/16 parts or about 4.7% shellac to harden the coating and to give good slippage to the paper as pointed out above.

While the preferred embodiment of the invention is as set forth supra, certain variations are within the scope of the invention. The casein can be replaced by adhesives such as animal glue, gelatine, and dextrine, which will stay in a fluid state. The modified starch, which is preferably potato starch, can be replaced by any modified starch that is thin boiling such as cassava, tapioca, corn and rice. The glucose or glycerine may be replaced by other hygroscopic materials such as salt. In place of the clay, calcium carbonate, barium sulphate or gypsum may be used as a filler.

The solution may be applied to the surface to be treated by a roll or round brush. Even spreading can be insured by using reciprocating flat brushes or smoothing rolls such as are used in putting on the ground coat in the manufacture of wall paper. The method of application is not important, however, as long as the paper is covered adequately. Upon drying, the paper is coated and protected.

I claim:

1. A grease-proofing and water-proofing composition consisting of the following:

1 part of modified starch
1 part of casein
1/16 part of ammonia
4 parts of clay
1½ parts of a hygroscopic agent selected from the group consisting of glucose and glycerine
5 pints of concentrated latex (50% solids)
4 pints of shellac solution (1 lb. shellac dissolved in 8 lbs. H₂O)

2. A grease-proofing and water-proofing composition comprising an aqueous dispersion of the following active ingredients:

| | Parts by weight |
|---|---|
| Modified starch | 1 |
| Casein | 1 |
| Ammonia | 1/16 |
| Clay | 4 |
| A hygroscopic agent selected from the group consisting of glucose and glycerine | 1½ |
| Rubber latex solids | 2½ |
| Bleached or orange shellac | ½ |

3. A sheet material coated with the composition of claim 1, and being adapted to wrap foodstuffs and the like.

4. A sheet material rendered grease and water proof with a coating containing the composition of claim 2 and being adapted to wrap foodstuffs and the like.

5. A grease and water-proofing composition for paper and the like comprising a water dispersion of approximately 23.7% of rubber latex, casein, modified starch, a filler, a hygroscopic plasticizing material, and approximately 4.7% shellac, which when dried produces a flexible non-tacky coating.

6. A grease and water-proofing composition for paper and the like comprising a water dispersion of approximately 23.7% of rubber latex, casein, a clay, a plasticizing agent selected from the group consisting of glucose and glycerine, and not more than about 4.7% shellac, which when dried produces a flexible non-tacking coating.

7. A grease and water-proof wrapping for foodstuffs and the like comprising a sheet material coated with a mixture of approximately 23.7% rubber latex, casein, modified starch, a filler, a hygroscopic plasticizing material, and approximately 4.7% shellac.

8. A grease and water-proof wrapping for foodstuffs and the like comprising a sheet material coated with a mixture of approximately 23.7% rubber latex, casein, modified starch, a clay, a plasticizing agent selected from the group consisting of glucose and glycerine, and not more than about 4.7% shellac.

JOHN E. SCHOPP.